Figure 1:
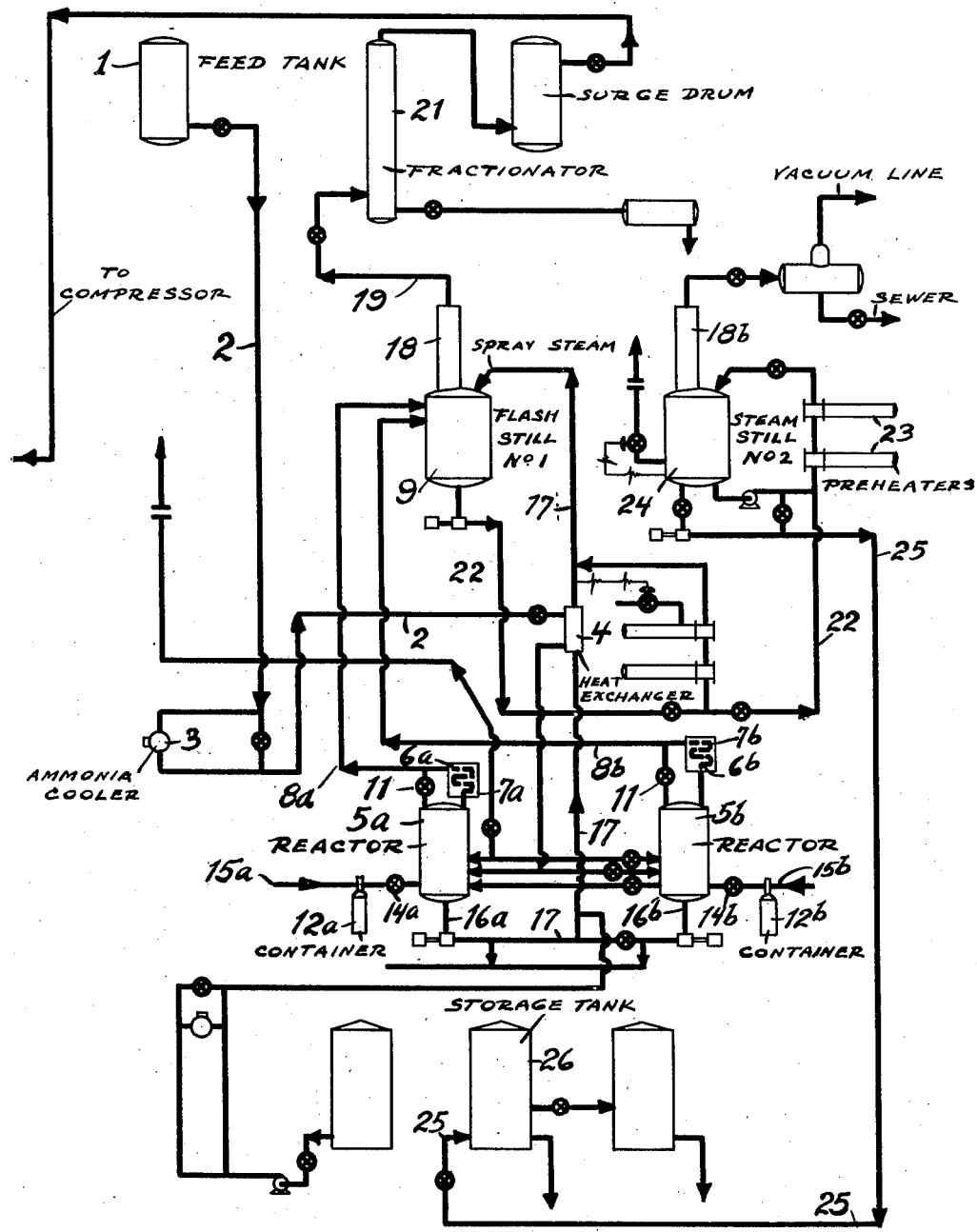

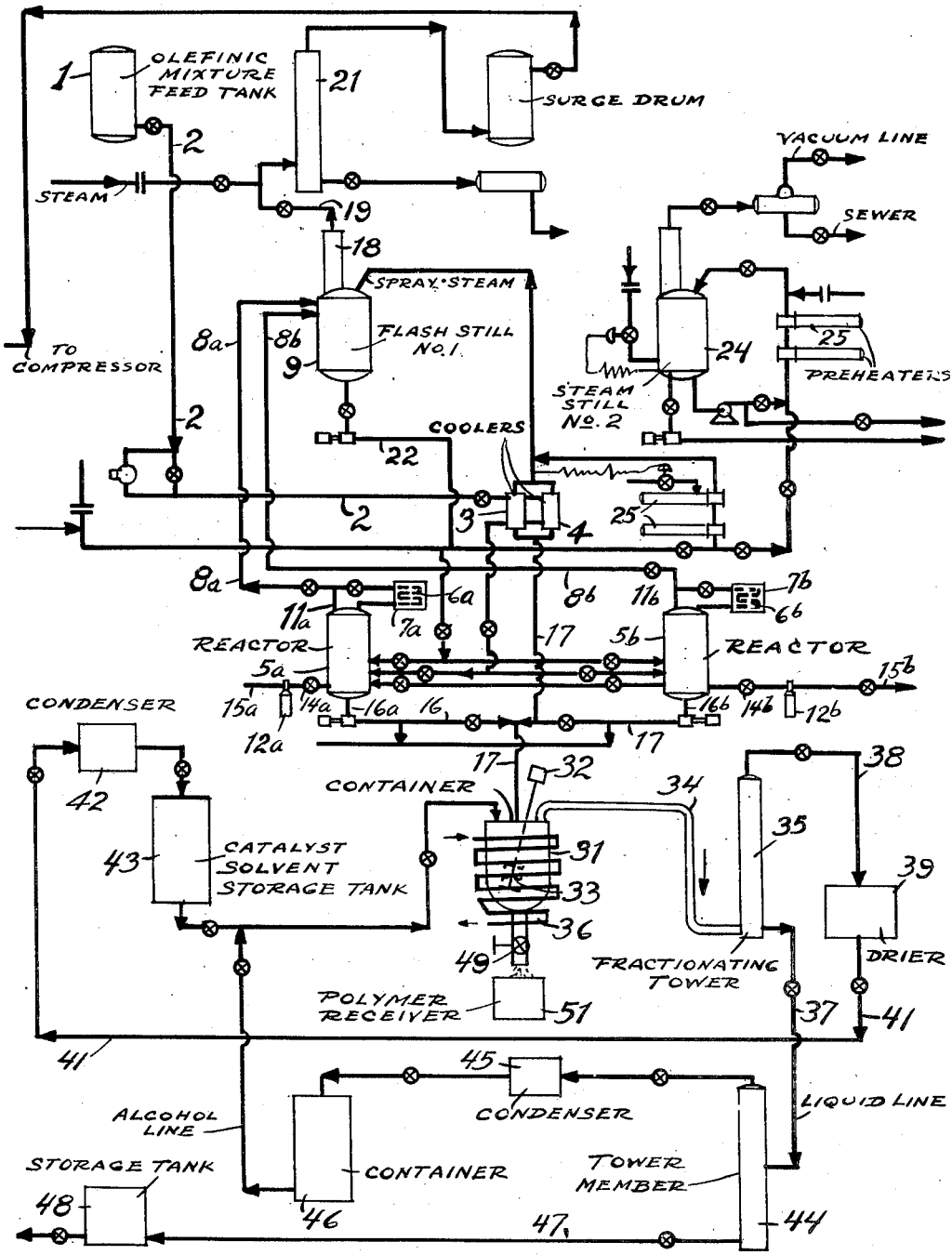
FIG.-II

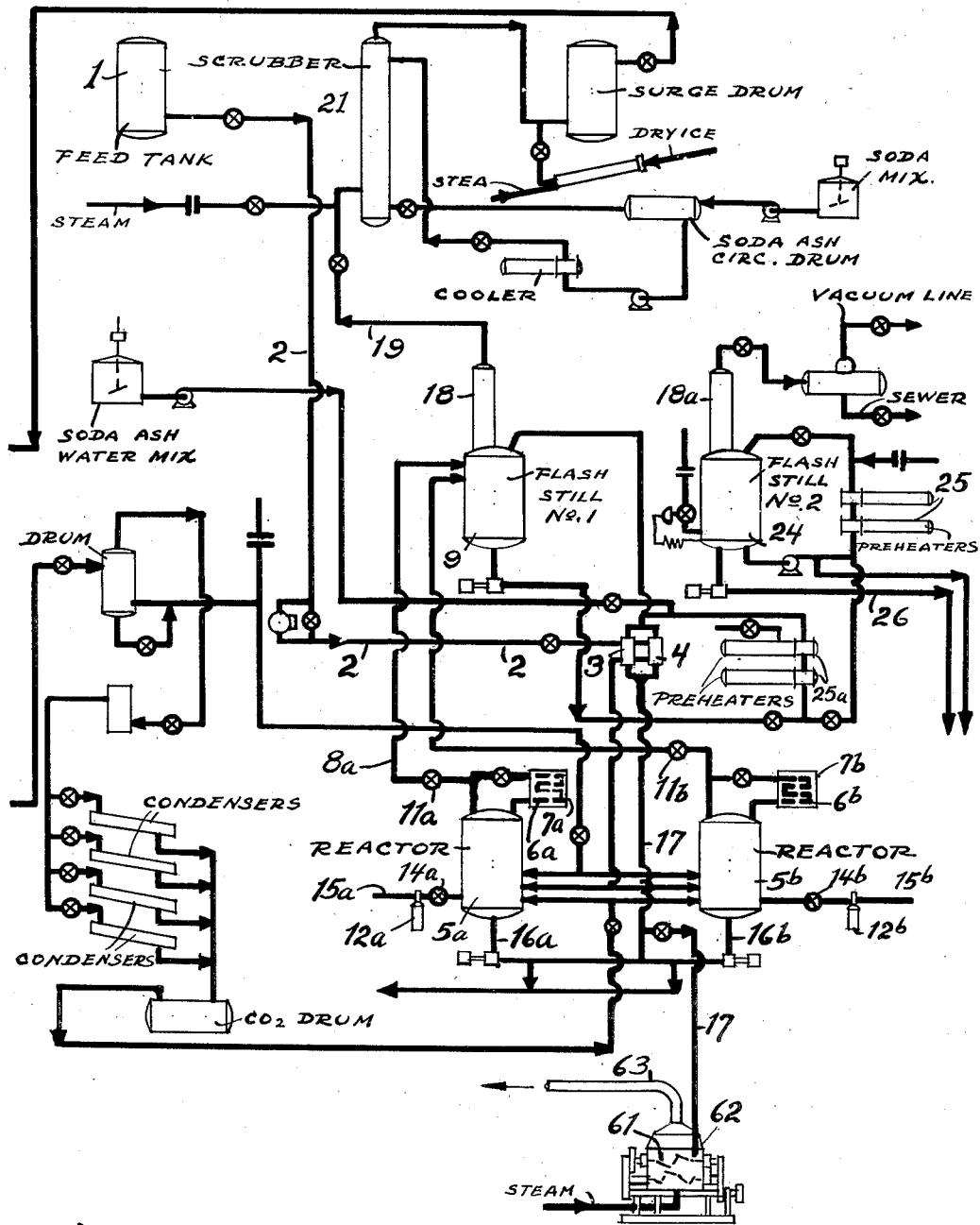
FIG.-III

UNITED STATES PATENT OFFICE 2,583,420

CONTROLLING HEAT OF REACTION BY REFLUXING IN THE BUTADIENE-DIISOBUTYLENE COPOLYMERIZATION

John D. Garber, Cranford, David W. Young, Roselle, and William J. Sparks, Cranford, N. J., assignors to Standard Oil Development Company, a corporation of Delaware Application July 11, 1945, Serial No. 604,350

2 Claims. (Cl. 260—85.3)

This invention relates to low temperature interpolymers; relates particularly to low temperature interpolymerization processes and relates especially to the low temperature interpolymerization of a major proportion of a multi-olefin with a minor proportion of an isoolefin at an automatically controlled low temperature.

It has been found that while the diolefins, particularly butadiene, polymerize at low temperature, the resulting polymers are powders which are insoluble and infusible and of very little utility because of the insolubility and infusibility.

It is now found that in the presence of various modifying agents, or copolymerizates, particularly the mono- or iso-olefins having from 3 to 20 carbon atoms per molecule, the character of the polymerization reaction is very greatly modified to yield a copolymer or interpolymer which is composed of a major proportion of the multi-olefin and a minor proportion of the isoolefin. This polymer is a solid resin of low elasticity, non-rubbery in character, but of good strength, readily soluble in a wide range of solvents including such substances as the hydrocarbons generally, and a wide range of the natural and synthetic oils and resins. In addition, the material may have, to a more or less degree, according to the percent conversion of the original mixture, and the degree of cyclization of the finished polymer, the unique property of heat bodying without molecular weight breakdown or discoloration.

As produced, the resin has a relatively high iodine number, usually between 30 and 275, and it has in addition the important property of oxidation drying in a manner analogous to that of the drying oils. Of particular importance is the fact that it is readily soluble in the natural and synthetic oils and the drying and baking oils generally; and can be heat bodied while in such solution to yield extremely valuable varnish and paint compositions.

It is now found that the material, by proper choice of reaction mixture, can be produced in the form of a thick, viscous multi-component solution by partial polymerization in the presence of appropriate solvents to yield a fluid composition which can be handled through pipes and pumps, from which the interpolymer is readily recovered, or from which solution the polymer is readily transferred to solution in some other desired solvent such as 54° naphtha, the petroleum solvent naphthas and in benzene, petroleum ether, lubricating oil or the like.

According to the present invention, the apparatus for conducting the process may consist of one or more reactors into which there is charged a reaction mixture of a multi-olefin such as butadiene and an isoolefin such as the octene obtained by dimerization of isobutylene, together with a refrigerant to cool the liquid, such as liquid propane or liquid methyl chloride or liquid ethane or even liquid ethylene, and, in some instances where too low a temperature is not required, liquid butane; and there may also be present ethyl chloride from a catalyst solution. These refrigerants may be replaced by an inert diluent and the heat of reaction removed by external cooling. The ethyl chloride solution is introduced in the form of a stream below the surface of the rapidly stirring material; containing dissolved therein a substantial quantity, usually 2% to 6 or 7%, of a Friedel-Crafts type catalyst such as aluminum chloride. The reaction is preferably carried to the stage of polymerization of a part only of the olefinic material, usually from 60% to 80%. Simultaneously, a substantial portion of the propane and other material which is volatilized out by the heat of reaction is returned to the polymerization mixture by a reflux condenser, and along with it there is returned a substantial proportion of the multi-olefin which in the case of butadiene would otherwise be loss. However, the multi-olefin and/or isoolefin may be added continually to the activated system. This cold reflux also supplies much of the refrigeration needed for the heat of reaction. At 60 to 80% yield, the material is a heavy syrupy liquid from which the solid polymer may be precipitated, by an alcohol such as isopropyl alcohol or methyl alcohol or ethyl alcohol, or the like, or similar alcohols, as desired; or by ammonia or substituted ammonia, or the like, or even by ethers, alcohols, aldehydes, organic acids, or, in fact, substantially any oxygenated organic compounds. The precipitated polymer or solution of polymer in the reaction mixture may be alkali washed or water washed, as desired, or the residual olefins and solvents may be boiled out as by spray drying or may be delivered to an oil in which the whole reaction mixture is soluble, from which the low boiling components are removed by steam or vacuum stripping.

An important part of the present invention is the apparatus and process for maintaining, automatically, a reaction temperature intermediate between the boiling point temperatures available in the various hydrocarbon refrigerants and consistent with the operating pressure, which may be from 0.1 to 5.0 atmospheres. Broadly, this procedure consists in adjusting the amount of internal refrigerant in the polymerization mixture to such an amount that the boiling point of the composite mixture is close to the desired value, and refluxing back into the reactor the material volatilized by the heat of reaction, through the agency of a strongly cooled reflux condenser. That is, a reaction temperature of approximately —20° C. is readily obtained by the use of liquid propane as an internal refrigerant, the amount of propane (which normally has a boiling point of approximately —40° C.) being adjusted so that the boiling point of the mixture is at the desired temperature. The vapors boiled out by the heat of reaction are then passed to a reflux condenser which is cooled to a temperature of —78° C. by solid $CO_2$ surrounding the reflux condenser. While the reflux, which is returned, is very cold, the quantity is dependent upon the amount of material volatilized. If the temperature gets much below the desired polymerization temperature, the amount of material boiled out becomes quite small and accordingly very little cold reflux is returned to be mixed in. As the temperature rises, the amount volatilized increases and the amount of cold condensate returned increases proportionately, resulting in a prompt reduction in temperature until an equilibrium is obtained between the temperature, the amount of material volatilized and the amount of cold reflux.

This procedure is exceedingly convenient since solid carbon dioxide is a cheap material, readily available on the market, whereas to obtain the same amount of refrigeration by the compression and condensing of gaseous propane requires expensive, elaborate and troublesome equipment.

Thus the process of the invention copolymerizes a major proportion of multi-olefin with a minor proportion of an olefin at a temperature within the range of $+10°$ C. and $-103°$ C. under reflux conditions, to return to the reaction mixture most of the refrigerant-diluent and substantially all of the volatilized olefinic material and simultaneously maintain a desired low polymerization temperature automatically. Other objects and details of the invention will be apparent from the following description when read in connection with the accompanying drawing wherein Fig. I is a diagrammatic view and flow sheet of the apparatus and process of the invention for producing an oil solution of polymer;

Fig. II is a diagrammatic view and flow sheet of the apparatus and process for producing a precipitated solid polymer; and Fig. III is a diagrammatic representation and flow sheet of apparatus and process for producing a kneader dried polymer product.

In practicing the invention the reaction mixture is prepared in a supply and storage tank 1 which may, if desired, be jacketed with a refrigerant such as liquid propane or liquid carbon dioxide or pulverized solid carbon dioxide in isopropyl alcohol or the like. The reaction mixture preferably consists of a major proportion of a multi-olefin and a minor proportion of an isoolefin with a substantial proportion of diluent or diluent refrigerant. For the multi-olefin the preferred component is butadiene but any multi-olefin having from 4 to 12 or 14 carbon atoms per molecule may be used. Other especially satisfactory substances are isoprene, piperylene, any of the dimethyl butadienes, dimethylallyl, myrcene, allocymene, and the like. For the isolefin, the preferred substance is the octene which is the dimer of isobutylene and known commercially as "dimer." This material is readily prepared by treatment of isobutylene with sulfuric acid which dimerizes the isobutylene to produce an isooctene. Alternatively, any normal or isoolefin having from 3 to about 20 carbon atoms per molecule may be used. Propylene is useful although not as satisfactory as some of the other olefins. Isobutylene is usable but usually not preferred since it is undesirably easily polymerizable. The normal butenes, the normal and isopentenes, the normal and isohexenes and the normal and isoheptenes, octenes, nonenes and decenes are particularly satisfactory. In addition, any of the normal- or isoolefins having up to about 20 carbon atoms per molecule are usable and satisfactory.

There is desirably present also a diluent or a diluent-refrigerant. The preferred material is a diluent-refrigerant in the form of liquid propane since this gives a conveniently low temperature and is readily and completely mixable with both of the other components. Liquid butane, either normal or iso, is equally useful, although its higher boiling point provides less advantageous refrigeration. As straight diluents, such substances as pentane, hexane, heptane, octane and the like, or mixtures thereof, or mixtures of light naphtha or the like are similarly usable. Benzene is also usable although less satisfactory. In some instances, liquid ethane, or even liquid ethylene may be used, although these materials usually provide lower temperatures than are desirable for a satisfactory reaction. Alternatively, a considerable range of halogenated hydrocarbons, both mono- and poly-halogenated may be used. Methyl chloride is usable as an excellent diluent-refrigerant although the temperature is not always as low as desirable. Liquid ethane is a highly desirable and advantageous diluent-refrigerant. Chloroform, ethylene dichloride and the like are also usable and effective diluents.

This mixture is prepared in the tank 1 and may be stored there as long as desired. If the tank 1 is jacketed with a refrigerating jacket, the mixture remains in storage indefinitely with substantially no change. If the tank 1 is merely insulated, a steady loss of propane occurs which, however, is readily replaced, either as such, or by reflux condensation using solid $CO_2$ as coolant.

At the appropriate time the olefinic mixture is transferred through a pipe 2 either directly, or through an ammonia cooler, to a heat exchanger 4 and to a reactor 5A or 5B. The reactor is desirably filled approximately ⅔ to ¾ full. The respective reactors are equipped with reflux coils 6A and 6B in refrigerant containers 7A and 7B. Each container 7 is filled with a mixture of solid carbon dioxide and an alcohol such as propyl alcohol to improve the rate of heat transfer to the coil. The respective reflux coils 6 are connected by pipes 8A and 8B to a flash still 9, to which uncondensed volatile material is delivered for reprocessing. Valves 11 are also provided for by-passing the reflux coil 6.

The polymerization is conducted at a temperature below $+10$, and usually above $-40$, this being the preferred range.

The catalyst may be any liquid or dissolved Friedel-Crafts halide material. Gaseous boron trifluoride is not a satisfactory catalyst since a sufficiently high concentration cannot be built up in the reactor and it tends to polymerize the butadiene alone into an undesirable polymer. The preferred type of catalyst is a strong solution or a saturated solution of aluminum chloride in methyl or ethyl chloride, the preferred concentration ranging from 0.8% to about 7%.

Alternatively, any of the catalysts disclosed by N. O. Calloway in his article on "The Friedel-Crafts Synthesis" printed in the issue of "Chemical Reviews" published for the American Chemical Society at Baltimore in 1935, in volume XVII, No. 3, the article beginning on page 327, the list being particularly well shown on page 375, may be used. That is, in addition to dissolved aluminum chloride, such substances as liquid titanium tetrachloride; or aluminum bromide, or aluminum chlorobromide, or aluminum alkoxy bromide in solution in the lighter petroleum hydrocarbons, or in solution in ethyl or methyl chloride, or carbon disulfide may be used. Similarly, boron trifluoride in 40-60% solution in the solvents may also be used.

For the solvent, practically any oxygen-free organic material having 1 to 8 or 10 carbon atoms per molecule, which is liquid at temperatures below 0° C. thereby being low freezing, which may be vaporized away from the Friedel-Crafts catalyst with a change in temperature of no more than one or two degrees, thereby being non-complex-forming, may be used.

The catalyst is conveniently prepared in a container 12A or 12B. For this purpose the aluminum chloride may be placed in the container 12, cooled and an appropriate amount of solvent added, the whole mixture then being stirred vigorously until the desired solution is obtained. The catalyst solution is then conveniently delivered by gas pressure through pipes 15A and 15B and filters 14A and 14B to the reactors 5A and 5B. This pressure may be obtained from compressed nitrogen or compressed carbon dioxide. It is preferable, however, not to use compressed air or anything contaminated with free oxygen.

The liquid catalyst is preferably delivered in the form of a fine, relatively high pressure jet into the body of the rapidly stirred olefinic material in the reactor 5. It may be delivered continuously in the form of a very fine stream, or may be delivered intermittently in the form of a coarser stream. It is desirable that the time of addition of the catalyst amount to a substantial number of minutes depending upon the size of the reactor and the amount of olefinic material therein. If the batch is small, on the order of less than a gallon, the catalyst delivery time is conveniently five to sixty minutes. If the batch size is from one to fifty gallons, the catalyst delivery time desirable is from 30 to 200 minutes. If the batch size is 100 to 1000 gallons, the catalyst delivery time is conveniently in the neighborhood of one to four hours.

The polymerization reaction is exothermic and a substantial portion of the diluent or diluent-refrigerant and a substantial portion of the olefinic material, depending upon the boiling point, may be volatilized by the heat of reaction. Preferably the catalyst rate is reduced during the latter stages of the reaction. The vaporized material passes to the top of the reactor and into the reflux coil 6 and is there cooled and condensed by the refrigerant in the container 7. This refrigerant preferably is solid carbon dioxide since it is easily handled and inexpensive, and is a highly efficient refrigerant. Alternatively, the container 7 may be closed and may be filled with such refrigerants as liquid propane, liquid carbon dioxide, liquid ethane or liquid ethylene, or even liquid methane.

If the reaction mixture is the preferred one containing butadiene and isobutylene dimer with propane and a substantial amount of ethyl or methyl chloride solvent from the catalyst, the dimer having a boiling point of approximately +100° C. shows very little vaporization, the vaporized mixture contains as its major component propane, as its minor component, butadiene, and as a trace to non-important component the ethyl chloride. All three are however condensed in the reflux coil 6, cooled to a temperature down to the range between −40° C. and −78° C., and returned to the reaction mixture where they are rapidly stirred in. The boiling point of the mixture, because of the presence of considerable quantities of dimer and dissolved polymer, tends to be in the neighborhood of −25° C. to +0° C., and when the temperature gets down to about −40° C. too little reflux is produced to bring in much additional cold liquid. Accordingly, even though the reflux condenser is intensively cooled, the temperature does not go much below the minimum boiling point of the mixture.

As above pointed out, it is usually preferable to halt the polymerization short of complete polymerization of all of the olefinic material in the original mixture. The preferred yield is from 60% to 80%. At this yield the contents of the reactor remain liquid in the form of a clear water white fluid of about the consistency of molasses, fluid enough to flow out of the reactor at reasonable speed; that is, the reactor usually can be emptied in less than three minutes. For this purpose, each of the reactors is equipped with bottom drains 16A and 16B leading to the pipe 17, the heat interchanger 4 and to a flash still 9. The flash still preferably is charged with a substantial quantity of warm solvent.

The warm solvent in the flash still 9 may be any one of a wide range of substances such as light naphtha, medium naphtha, heavy naphtha, lubricating oil, or the like. The still 9 may conveniently be steam jacketed and may, if desired, be equipped with an injection coil for the direct injection of steam which is desirable when the warm oil therein is not volatile at a temperature of live steam. The still 9 may be equipped with a reflux condenser 18, and a pipe 19 connected to the reflux condenser 18 leads to a fractionator 21 for the purification of the output vapors.

The polymerizate mixture from the reactor 5 delivered to the flash still 9 simultaneously dissolves in the warm oil therein and volatilizes out the residual diluent-refrigerant, the residual catalyst solvent and the unpolymerized olefins which are discharged through the pipe 19 and the still 21 for fractionation and reuse. If the warm oil in the flash still 9 has a low boiling point, the reflux condenser 18 is used to prevent loss of light solvent. If the warm oil has a higher boiling point, the reflux condenser 18 serves no function. If the warm oil has a boiling point above the temperature of live steam, steam may be blown through the contents of the still to strip out the last traces or refrigerant, olefin and catalyst solvent. When the oil solution is fully stripped, it may be delivered to storage. If, on the other hand, the solution is a relatively low boiling material, it is desirable to steam strip or water wash the solution, in which case the solution may be delivered through the pipe 22 through a preheater 23 to a second still 24 in which live steam or water as desired may be applied to the oil solution (under vacuum if desired) to reduce the temperature. The finished oil solution is then discharged through a pipe 25 to storage tank 26 from which it may be delivered for sale, or for further purification and processing in the preheater 27, cooler 28, etc.

By this process there is thus obtained a solution containing a substantial portion of the desired polymer.

The polymer per se as obtained by this process may have a molecular weight ranging from about 500 to about 100,000 (as obtained by the Staudinger Method). The polymer also has an iodine number which may range between 30 and 275 depending upon the relative proportions of the monoolefin and diolefin.

It may be noted that in the polymerization reaction all of the unsaturation disappears from the monoolefin, except perhaps the unsaturation of the last monoolefin molecule to be added to the polymer; and one unit of unsaturation disappears from each multi-olefin molecule. Thus, if equal molecular proportions of monoolefin and diolefin are copolymerized, the resulting copolymer may have an unsaturation of 50 molecular per cent since there is a double linkage left in the chain for each two original molecules. If the polymerizate contains 75% of the diolefin molecules and 25% of the monoolefin molecules, the unsaturation becomes 75 molecular per cent. It may further be noted that if the polymer contained only butadiene (which, of course, is not possible if the iodine number is to be obtained) and there were no cross linkage, the unsaturation would be measured by an iodine number of approximately 454; and if the polymer contained 50% butadiene and 50% dimer, and there was no cyclization and no cross linkage, which is a condition not difficult to obtain in such a proportion, the iodine number would be approximately 228.

It may be noted that there is usually a little gel formation which indicates cross linkage and usually a little cyclization, both of which reduce the unsaturation below the theoretical value; also there are some indications that the Wijs method does not always measure all of the actual unsaturation in terms of the absorption of iodine, which may still further reduce the iodine number. Nevertheless, most of the polymers prepared according to the present invention have iodine numbers within the range between 30 and 275.

By this embodiment of the invention there is thus obtained an exceedingly valuable solution of polymeric resin which has many important uses.

These uses may be for such items as adhesives, coatings for paper, wood, iron, glass, plastics, and the like. The polymer may also be compounded into all of the rubber-like substances including caoutchouc, Buna S, Perbunan, polychloroprene, and the like. The resin is also compatible with, and may be compounded into, practically all of the thermoplastic and thermosetting resins, without exception. The polymer is compatible with the sulfonated corn oil product known as "Factice" on which it shows a substantial stiffening and hardening action. The resin is also compatible with, and soluble in, all of the mineral oils; all of the hydrocarbons, and also in all of the waxes and asphalts, in which it serves to produce a substantial and valuable hardening and stiffening action, and usually a substantial increase in the melting point. In lubricating oils it shows a substantial thickening effect, and a substantial increase in the Viscosity Index.

It is not necessary that the polymer be recovered in solution; since it is readily recovered in solid resin form, substantially free from other substances.

Referring to Fig. II, the olefinic mixture is prepared in the storage drum 1, as previously described, and delivered through pipe 2 and coolers 3 and 4 to the reactors 5, in which it is polymerized in the same manner as above described under a reflux controlled temperature. When the polymerization has reached the desired stage the polymer is discharged through the pipes 16 and 17 into a container 31, in which there is provided a substantial quantity of precipitant which may conveniently be an alcohol, in the proportion of approximately 3 volumes per volume of polymerized feed delivered to the container 31. The alcohol may be isopropyl alcohol or ethyl or methyl alcohol or may even be butyl alcohol in its various forms. Alternatively, any of the poly alcohols such as the glycols, or glycerine or the like may also be used, if desired, and, in fact, substantially any of the oxygenated organic compounds including not only alcohols, but also the ethers, the aldehydes, and the organic acids may equally well be used. This treatment precipitates the solid polymer. The mixture is desirably stirred by the motor 32 and propeller 33 until the precipitation is substantially complete. The mixture is then desirably allowed to stand and settle for approximately one hour. During this time most of the low-boiling solvents including the refrigerant, catalyst solvent and any unpolymerized butadiene will volatilize or "weather out" and leave the container 31 through the outlet pipe 34 to a fractionating tower 35. The container 31 is equipped with a steam jacket 36, and when most of the low boiling volatiles have weathered out, steam may be turned into the steam coil or jacket 36 to boil out substantially all of the alcohol and as much as possible of the unpolymerized dimer. The tower 35 serves to separate the alcohol and dimer from the lower boiling components; the alcohol and dimer being delivered as liquids through the pipe 37, and low boiling volatiles being taken overhead through the pipe 38 to a dryer 39. From the dryer 39 the dry gases mostly consisting of refrigerants such as propane; and catalyst solvent such as ethyl or methyl chloride, are carried through a pipe 41 and condenser 42 and delivered to a storage tank 43 in which it may be stored for reuse. Simultaneously, the bottoms discharged through the pipe 37 may be taken to a tower member 44 in which the precipitating alcohol and residual quantities of volatilized dimer are separated; the residual alcohol being taken overhead through a condenser 45 to storage in a container 46 from which the alcohol may be returned to the container 31. Simultaneously, the residual dimer may be discharged through a pipe 47 to a storage tank 48 from which the dimer may subsequently be returned to the polymerization feed supply system. When the solvents are reasonably well volatilized out from the solid polymer, the valve member 49 at the bottom of the reactor 31 may be opened to discharge the polymer into a receiver 51. It may be noted that the polymer is sufficiently fluid to flow out from the container 31 at temperatures ranging from 115° C. to 130° C.

By this modification of the apparatus and process of the invention there is thus obtained an excellent solid resin which is slightly plastic at room temperature, readily plastic at moderately elevated temperatures, with an iodine number within the range of 30 to 275, and a molecular weight within the range between 500 and 100,000 as above described. This polymer is readily mixed with a wide variety of fillers and auxiliary substances as above outlined, and, either in pure form or admixed with these auxiliary substances is readily thermoplastic and thermosetting. That is, the crushed or pulverized material may be placed in a mold with or without fillers, fabric and the like, and heated under substantial pressure, whereupon the material coalesces and flows into all the mold interstices; then upon continued heating it cyclicizes to reduce sharply both the iodine number and the solubility, yielding a formed structure the material of which is insoluble in most solvents and resistant to temperature up to about 250° to 450° C.

Alternatively, the polymer may be recovered in the pure solid form by a variety of other procedures. The cold polymerizate mixture from the polymerizers 5 may be delivered to a kneader type device in which the polymer is stirred and kneaded by the kneader blades until all of the volatiles are driven off, and a thoroughly homogeneous uniform material is obtained. This may be discharged from the kneader, hot, or the kneader may be cooled with the blades in continuing operation to break up the polymer into a mass of granular particles. Alternatively, the polymerizate mixture from the reactors 5 may be delivered to an auxiliary drum which, when nearly full, may be pressurized by such substances as compressed nitrogen or compressed carbon dioxide to force the polymer through a steam jacketed heating coil in which it is heated to a temperature well above the boiling point of all of the solvents and well above the melting point of the polymer. The hot fluid mixture, which may be fully liquid, or may be liquid and gas mixture is then discharged through a throttle valve into a cold receiver, preferably filled with flowing cold inert gas. The sensible heat of the mixture volatilizes the solvents carrying them off for recovery from the inert gas, and the cool entering gas solidifies the fluid polymer into a finely granular form. Alternatively, the cold liquid polymerizate mixture may be delivered to a steam jacketed extruder in which the volatiles are driven off and the plastic to semi-liquid polymer is forced through a die plate and delivered to a receiver substantially free from volatile components.

The preferred form for this recovery is the kneader system as shown in Fig. 3.

Referring to Fig. III, the polymerization mixture is prepared in the tank 1 and delivered to the polymerizers 5 as previously described. When the polymerization has reached the desired stage the syrupy polymer solution is delivered through the pipe 17 to a Werner and Pfleiderer kneader 61 which is preferably steam jacketed. The kneader 61 is preferably equipped with a vacuum tight cover member 62 which is connected through a pipe 63 to a condenser and to a storage tank (not shown) for reception of the condensate; or the recovery system shown in Fig. II may be used, the volatiles being withdrawn by a vacuum pump and sent through a series of fractionating towers to separate the various components, as shown in Fig. II. In the kneader the polymer solution is heated and worked until the temperature has reached approximately 115° C., if dimer is used as the mono-olefinic component. During the time required to bring the polymer up to this temperature, and by virtue of the continuous kneading during the heating time, substantially all of the propane diluent-refrigerant is volatilized out, substantially all of the methyl chloride catalyst solvent is volatilized out, and substantially all of the butadiene and dimer are volatilized out, leaving behind only the polymeric resin with traces of catalyst. If desired, live steam may be passed through the mass in the kneader during the kneading operation. It is, however, preferable that the live steam be not passed through the mixture until a temperature of approximately 75° C. has been reached. Also the mass in the kneader may be covered by nitrogen or carbon dioxide to protect the light color and avoid premature oxidation of the polymer.

To remove the catalyst, the polymer may be thrown on to the open roll mill and washed with water, preferably at a temperature not too far below 100° C. The washing may be conducted with pure water only, or it may be conducted with an alkaline solution such as ammonia water or soda solution, or the like. This procedure likewise yields an excellent solid polymer which, however, may still contain traces of catalyst. These, however, are not harmful since they do not lead to depolymerization and do facilitate the heat bodying.

*Example 1*

Utilizing a storage reservoir 1, having an 80 gallon capacity, approximately 9 gallons of diisobutylene were metered into the storage drum at approximately room temperature. When the diisobutylene was entirely added approximately 15 gallons of liquid propane cooled to $-78°$ C. by passage through a "Dry Ice" or solid $CO_2$ cooling coil was delivered to container 1. In the meantime, the material had been thoroughly stirred by a motor driven agitator. When the temperature had been reduced to approximately $-28°$ C., 13½ gallons of butadiene were delivered to the storage container, and in order to maintain the temperature of $-28°$ C., a continuing small stream of liquid propane cooled to $-78°$ C. was added at a rate of approximately 12 gallons per hour. This material was then delivered to the reactor 5A, continuing the slow addition of liquid propane.

Simultaneously a solution of aluminum chloride in ethyl chloride was prepared in a concentration of 3.6%. This catalyst solution was cooled to $-78°$ C. and delivered in the form of a fine stream or jet into the mass of the material in the reactor 5A, maintaining a rapid stirring of the entire reactor contents during the delivery of the catalyst. Care was taken to ensure the addition of the catalyst entirely under the surface of the reaction mixture in order to avoid polymerization of the butadiene vapors alone in the vapor space above the liquid since such polymerization yields an insoluble infusible polymer, called by the workmen "popcorn," which is useless and a waste of butadiene. The addition of the catalyst continued over about one hour and approximately 8 gallons were added. This amount of catalyst was sufficient to polymerize approximately 55% of the olefinic material in the original mixture. When all the catalyst had been added, steam was turned into a steam heating coil around the reactor and the temperature of the reaction mass was raised to about −6.6° C. (+20° F.); no liquid propane being added to the reactor during this time. When the temperature had reached 6.6° C. (+20° F.) the steam supply was discontinued and the polymer mixture was allowed to remain in the reactor with gentle stirring for ½ hour. At the end of this time, approximately one-half gallon of a mixture of equal parts of 99% butyl alcohol and a 36 weight per cent water solution of ammonium hydroxide was added to the reactor. This mixture served to inactivate the catalyst. The mixture was stirred with the alcoholic ammonia solution for ten minutes. At the end of this time the thick syrupy liquid solution was drained from the bottom of the reactor to a steam jacketed kneader in which it was stirred and kneaded between kneader blades as shown in Fig. III. Simultaneously, steam was delivered to a steam jacket on the kneader and the temperature was gradually raised. The continued stirring, kneading and heating stripped out the propane, the unreacted butadiene, the ethyl chloride of the catalyst solution and the unreacted dimer and the water, ammonia, and isopropyl alcohol. This treatment was continued over a period of two hours during which time the temperature of the mass in the kneader rose to 118° C. At this point the steam supply was discontinued and approximately 25 pounds of solid carbon dioxide was added to the resin in the kneader to cool it below its softening point and to make it sufficiently brittle to be easily removed from the kneader. The resulting resin was nearly water white, with a very slight yellow color from minor amounts of iron impurities. The yield of solid dry resin was 70% of the original weight of butadiene and dimer.

A proximate organic analysis was made for carbon and hydrogen with the following results:

Per cent carbon _____ 85.28
Per cent hydrogen _____ 12.58
The carbon to hydrogen ratio was _____ 6.8

A portion of the resin was then dissolved in toluene and reprecipitated by the addition of a small portion of isopropyl alcohol. The precipitate was separated, the residual traces of toluene evaporated out and the material was again analyzed to yield the following proximate analysis:

Per cent carbon _____ 85.43
Per cent hydrogen _____ 12.41
The carbon to hydrogen ratio was _____ 6.9

These results show that a true copolymer was formed since the hydrogen to carbon ratio did not change within the experimental error of analysis.

Example 2

The equipment shown in Figure I was utilized for the production of a polymer solution in light naphtha. The charge was prepared as above outlined in the storage tank 1, cooled and delivered to the reactors 5A and 5B as above described. The polymerization was conducted as previously described to yield a thick viscous solution of polymer in cold, liquid, propane-dimer-butadiene-ethyl chloride mixture. The syrupy solution was then delivered from the reactor through the pipes 16 and 17 to the flash still 9 which contained a considerable quantity of cold light naphtha. The cold viscous polymer solution was delivered through a feed pipe leading from the top of the still nearly to the bottom, thereby delivering the cold mixture under the surface of the naphtha. The polymer solution as a whole dissolved readily in the naphtha which was stirred vigorously by a propeller stirrer (not shown). Simultaneously, steam was added to a steam jacket around the still to maintain the temperature of the naphtha. This procedure resulted in the rapid boiling out of the residual propane, butadiene and catalyst solvent; and as the temperature rose, more and more of the unpolymerized diisobutylene (or isooctene) was boiled off. This material was sent through the pipe 19 to the fractionation column 21. In the column 21, there were produced dimer as bottoms and a mixture of propane, butadiene and ethyl chloride as "overhead." A second fractionator separated the ethyl chloride as bottoms, leaving only the propane and butadiene in the "overhead." A third fractionator recovered the butadiene as bottoms and delivered substantially pure propane to storage for reuse.

The solution remaining in the flash still 9 was transferred through the pipe 22 to a second still 24, in which a vacuum distillation, with or without a current of steam as desired, was conducted. This served to remove the last traces of dimer which was recovered in a condenser. From the steam still 24 the material was discharged through a pipe line 25 to storage in the tanks 26 after it had been water washed free of chloride ions as determined by a silver nitrate test.

Example 3

Referring to Figure II, the mixture was prepared in the storage tank 1 as in Example 1, cooled and transferred through the pipe 2 to the reactors 5A and 5B where it was polymerized as in Example 1. The resulting polymer mixture was delivered as above from the polymerizers 5 through pipes 16 and 17 to a receiver 31 in which it was treated with a small quantity of isobutyl alcohol which served both to inactivate the catalyst and to precipitate the polymer from the solution. The precipitated polymer coalesced readily into a solid mass at the bottom of the container and the cold liquid mixture of residual butadiene, residual dimer, residual propane and alcohol was readily decanted from the precipitated solid polymer. The solid polymer was readily removed from the reactor and was dried on a drum drier to yield the desired solid polymer substantially free from catalyst and in a particularly convenient granular form well suited to pack and to subsequent melting and other operations.

Example 4

Referring to Fig. III, a mixture was prepared in the tank 1 which consisted of 7 parts by weight of liquid isoprene, 90 parts by weight of methyl chloride and 6 parts by weight of trimethyl ethylene. This material was delivered to the polymerizers 5 and was polymerized by the addition thereto of approximately 10 parts by weight of a 3.5% solution of aluminum chloride in methyl chloride, as before described. The polymerizate was discharged into the flash still 9 of Fig. I in which the unvolatilized methyl chloride was boiled out for subsequent recovery and reuse, and residual portions of isoprene and trimethyl ethylene were also separated to yield a solution of polymer in medium naphtha. The reaction proceeded smoothly and easily and the polymer dissolved readily in the medium naphtha to yield a solution of the polymer in medium naphtha.

Vaporization of the naphtha showed that the polymer was not quite a solid but was a very heavy, viscous oil having an iodine number of approximately 200 and a Staudinger molecular weight number of approximately 800. To this material there was then added the amounts of lead and cobalt naphthenate above indicated, and the material was warmed up and blown briefly with air to obtain a partial thickening. The fluid solution was then spread upon panels and the naphtha allowed to evaporate leaving behind a good film of heavy, almost solid polymer. This polymer was then baked at 290° F. for 50 minutes whereupon it was found to be converted to a hard, tough, non-brittle protective film which was found to be highly resistant to solvents, acid, alkali, and weathering.

Example 5

A mixture was similarly prepared in the tank I of Fig. I consisting of 5 parts by weight of styrene, 8 parts by weight of isoprene, and 9 parts by weight of trimethyl ethylene together with 9 parts by weight of methyl chloride. This mixture was then cooled to approximately $-30°$ C. and delivered to the reactors 5 where it was polymerized by the addition of approximately 10 parts by weight of a 3.5% solution of aluminum chloride in methyl chloride. This amount of catalyst was sufficient to give nearly 100% conversion in the olefinic materials. The resulting polymerizate mixture was a moderately heavy, viscous solution. This material also was delivered to the flash still 9 in which the residual methyl chloride and unpolymerized olefins were removed to yield a solution of polymer in naphtha. The resulting polymer was found to have an iodine number of approximately 175 and upon volatilization of the naphtha, was found to be a solid, but soft, plastic substance. The usual amounts of naphthenate dryers were added to the solution and it was used as a coating composition. It dried tack-free in approximately 3½ to 4 hours and in 96 hours it oxidized to a solid, tough, flexible, protective film. Other portions were applied as surface films and baked by heating to 290° F. for approximately one hour to yield a very durable, tough, non-brittle, insoluble protective film.

Example 6

A mixture was prepared consisting of 75 parts by weight of octadecylene with 50 parts by weight of butadiene in 125 parts by weight of methyl chloride. This material was delivered to the reactors 5 at a temperature of approximately $-40°$ C. and was polymerized therein by the addition of approximately 50 parts by weight of a 3.5% solution of aluminum chloride in methyl chloride. This material was delivered from the polymerizer 5 to the container 31 of Fig. II and was there treated with approximately 100 parts by weight of isopropyl alcohol. Upon removal of the volatiles and alcohol, the polymer was found to be a solid, but relatively soft, resin which was readily soluble in naphtha type solvents and compatible with linseed oil and the other drying oils and customary varnish and paint, resins and gums to yield an excellent varnish and paint base.

Another portion of the same polymerizate was delivered to the flash still 9 of Fig. I and dissolved in a light lubricating oil. The dilutions and unpolymerized material was removed, as previously described, leaving a solution of polymer in lubricating oil. In such solution, the polymer was found to have an excellent thickening action and to yield a very satisfactory improvement in the viscosity index. The material was found to be thoroughly stable in storage and in use, the rate of the breakdown from mechanical working was to a large extent compensated by repolymerization through oxidation. As a result, the viscosity and viscosity index of the oil were unusually well maintained during the entire life of the oil.

Example 7

A mixture was prepared in the container I of Fig. III consisting of 600 parts by weight of styrene monomer and 400 parts by weight of isobutylene in 3300 parts by weight of liquid propane. This material was cooled to approximately $-40°$ C. and transferred to the reactors 5 where it was treated with 500 parts by weight of an 0.9% solution of aluminum chloride in methyl chloride. The heat of reaction caused a rapidly boiling of the propane and the propane vapors were condensed in the reflux coil 6 and returned at a temperature of approximately $-78°$ C. to the reaction mixture, the rate of boiling and return being such as to maintain a temperature of approximately $-40°$ C. in the reaction mixture. Substantially all of the styrene and isobutylene were copolymerized to yield a relatively fine grained slurry which was discharged through the pipe 17 to the kneader 61. Steam in the kneader jacket volatilized out the propane which was delivered through the pipe 63 to a condenser and pumped to storage. Continuous kneading of the mixture during the volatilization of the propane converted it into a dry, granular solid which has many uses as a coating compound and a structural element.

It may be noted that in each of these procedures the temperature of the reaction mixtures was maintained at the boiling point by the return to the material of a very cold reflux, the amount of reflux being automatically adjusted by the elevation of the temperature of the reaction mixture above the boiling point.

The process of the invention thus copolymerizes a mixture of multi-olefin and isoolefin in the presence of a diluent-refrigerant under refluxing conditions, whereby a quantity of very cold reflux is returned to the reaction mixture according to the rate of polymerization and the rate of liberation of heat of reaction, to yield a polymer resin utilizing a portion only of the raw material, relying upon the diluent-refrigerant and unpolymerized material to maintain a liquid solution which is readily processed by the precipitation of the polymer from the solution or by the simultaneous flash distillation of all of the materials present, except the polymer and solution of polymer in another oil; or the weathering off of the unpolymerized material and diluent-refrigerant during stirring and kneading conditions; to yield either a solution of polymer in oil or a solid polymer.

While there are above disclosed but a limited number of embodiments of the process and products of the invention, it is possible to produce still other embodiments without departing from the inventive concept herein disclosed and it is therefore desired that only such limitations be imposed on the appended claims as are stated therein or required by the prior art.

What we claim is:

1. An improved process for copolymerizing olefinic materials which comprises admixing together a major proportion of butadiene and a minor proportion of diisobutylene, together with cold liquid propane in an amount sufficient to obtain at all times during the reaction a mixed boiling point of the total reaction mixture within the range of about +10° C. to —40° C., copolymerizing the mixed olefins at a temperature of about +10° C. to —40° C. which is partially maintained by the continuous, slow addition of liquid propane, catalyzing the copolymerization by the slow, continuous addition beneath the surface of the reaction mixture of the cold mixed olefins and liquid propane of a stream of liquid catalyst solution of aluminum chloride dissolved in an alkyl chloride selected from the group consisting of methyl chloride and ethyl chloride, the rate of addition of said catalyst solution being adjusted in proportion to the quantity of mixed olefins remaining unpolymerized, substantially maintaining the temperature within the range of about +10° C. to —40° C. during the copolymerization by the return to the reaction mixture as cold condensed reflux of substantially all of the propane and olefinic material volatilized during the copolymerization by the heat of reaction, adjusting the reflux return rate to correspond to the rate of evolution of heat of the copolymerization reaction, continuing said copolymerization until from 60% to 80% of the mixed butadiene and diisobutylene are copolymerized, whereby there is produced a fluid solution of copolymer in propane and residual unreacted olefins, which solution of copolymer, at the polymerization temperature, is of sufficiently low viscosity to be a free flowing fluid, quenching the copolymerization reaction, and isolating the copolymer of butadiene and diisobutylene from the solution of propane and residual unreacted olefins to obtain a polymer which is characterized by solidity, low elasticity, a Staudinger molecular weight in the range between 500 and 100,000, an iodine number in the range between 30 and 275, a melting point near the boiling point of water, and the property of being thermosetting.

2. An improved process for copolymerizing olefinic materials which comprises admixing together about 13 parts by volume of butadiene and about 9 parts by volume of diisobutylene, together with liquid propane cooled to —78° C., in an amount sufficient to obtain at all times during the reaction a mixed boiling point of the total reaction mixture approximately equal to the desired polymerization temperature, copolymerizing the mixed olefins at a temperature of about —28° C. which is partially maintained by the continuous, slow addition of liquid propane, catalyzing the copolymerization by the slow continuous addition beneath the surface of the reaction mixture of cold mixed olefins and liquid propane of about 8 parts by volume of a 3–4 wt. per cent solution of aluminum chloride catalyst dissolved in ethyl chloride, the rate of addition of said catalyst solution being adjusted in proportion to the quantity of mixed olefins remaining unpolymerized, substantially maintaining the temperature at about —28° C. during the copolymerization by the return to the reaction mixture as cold condensed reflux of substantially all of the propane and olefinic material volatilized during the copolymerization by the heat of reaction, adjusting the reflux return rate to correspond to the rate of evolution of heat of the copolymerization reaction, continuing said copolymerization until from 60% to 80% of the mixed butadiene and diisobutylene are copolymerized, whereby there is produced a fluid solution of copolymer in propane and residual unreacted olefins, which solution of copolymer, at the polymerization temperature, is of sufficiently low viscosity to be a freely flowing fluid, quenching the reaction with a small amount of butyl alcohol and aqueous ammonium hydroxide, isolating the copolymer of butadiene and diisobutylene from the solution of propane and residual unreacted olefins, kneading the resulting polymer to remove residual contaminants from the reaction mixture to obtain a polymer which is characterized by solidity, low elasticity, a Staudinger molecular weight in the range between 500 and 100,000, an iodine number in the range between 30 and 275, a melting point near the boiling point of water, and the property of being thermosetting.

JOHN D. GARBER.
DAVID W. YOUNG.
WILLIAM J. SPARKS.

REFERENCES CITED

The following references are of record in the file of this patent:

UNITED STATES PATENTS

| Number | Name | Date |
|---|---|---|
| Re. 17,898 | Carney | Dec. 9, 1930 |
| 1,955,873 | Deanesly | Apr. 24, 1934 |
| 2,062,845 | Thomas, C. A. | Dec. 1, 1936 |
| 2,122,826 | Van Peski | July 5, 1938 |
| 2,142,980 | Huijser | Jan. 3, 1939 |
| 2,155,315 | Kremers | Apr. 18, 1939 |
| 2,178,833 | Erasmus | Nov. 7, 1939 |
| 2,240,618 | Harris | May 6, 1941 |
| 2,255,388 | Kunc | Sept. 9, 1941 |
| 2,276,893 | Thomas, R. M. | Mar. 17, 1942 |
| 2,327,134 | Schuftan | Aug. 17, 1943 |
| 2,379,656 | Ruthruff | July 3, 1945 |
| 2,476,000 | Sparks | July 12, 1949 |